(12) United States Patent
Takahashi et al.

(10) Patent No.: US 8,538,178 B2
(45) Date of Patent: Sep. 17, 2013

(54) IMAGE PROCESSING DEVICE AND IMAGE PROCESSING METHOD

(75) Inventors: Kashu Takahashi, Tokyo (JP); Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 13/162,173

(22) Filed: Jun. 16, 2011

(65) Prior Publication Data

US 2011/0311152 A1 Dec. 22, 2011

(30) Foreign Application Priority Data

Jun. 22, 2010 (JP) ................................ P2010-141568

(51) Int. Cl.
*G06K 9/36* (2006.01)
(52) U.S. Cl.
USPC .......................................................... 382/238
(58) Field of Classification Search
USPC .............. 382/232–251; 375/240.01–240.29; 386/328–332
See application file for complete search history.

(56) References Cited

U.S. PATENT DOCUMENTS

| | | | | |
|---|---|---|---|---|
| 5,703,646 | A * | 12/1997 | Oda | 375/240.13 |
| 5,799,129 | A * | 8/1998 | Muto | 386/329 |
| 6,603,815 | B2 * | 8/2003 | Suzuki et al. | 375/240.2 |
| 7,224,734 | B2 * | 5/2007 | Suzuki et al. | 375/240.2 |
| 7,583,731 | B2 * | 9/2009 | Hagai et al. | 375/240.13 |
| 8,170,120 | B2 * | 5/2012 | Fuchie et al. | 375/240.26 |
| 2002/0057739 | A1 | 5/2002 | Hasebe et al. | |
| 2008/0056358 | A1 | 3/2008 | Fuchie et al. | |

FOREIGN PATENT DOCUMENTS

| | | |
|---|---|---|
| JP | 2002 199392 | 7/2002 |
| JP | 2008 66851 | 3/2008 |

* cited by examiner

*Primary Examiner* — Ishrat I Sherali
(74) *Attorney, Agent, or Firm* — Frommer Lawrence & Haug LLP; William S. Frommer

(57) ABSTRACT

An image processing device includes: a plurality of encoding units that encode image data; a shared memory that stores reference image data which is used for encoding performed by each of the plurality of encoding units; and a control unit that secures an encoding unit from the plurality of encoding units, which is made to encode an intra-frame prediction encoded image and a forward prediction encoded image by priority, and that makes an encoding unit, which is not used to encode the intra-frame prediction encoded image or the forward prediction encoded image, encode a bidirectional prediction encoded image, using reference image data stored in the shared memory during a period where the secured encoding unit does not perform the encoding.

7 Claims, 9 Drawing Sheets

FIG. 7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| (A) | | | I2 | B3 | B4 | P5 | B6 | B7 | P8 | B9 | B10 | P11 | B12 | B13 | P14 | B0 | B1 | I2 | B3 | B4 | P5 | B6 | B7 | P8 | B9 |
| (B) | B0 | B1 | | | | | | | | | | | | | | | | | | | | | | | |
| (C) | | | I2 | | | B0 | P5 | | B3 | P8 | | B6 | P11 | B12 | P14 | | B1 | I2 | | | B0 | P5 | | B3 | P8 |
| (D) | | | | | | | | | | | | | | | | | | | | | | | | | |
| (E) | | | | | | B1 | | | B4 | | | B7 | | B13 | | B10 | | | | | B1 | | | B4 | |
| (F) | | | | | I2L | | | | P5L | | | | | | | | | P11L | | | | | | | |
| (G) | | | | | | | | | | | | | | | | | | | | | I2L | | | | |
| (H) | | | | | | | | | P8L | | | | | | | | | | | | | | | P5L | |
| (I) | | | | | I2E | | | P5E | | | | P8E | | | | P11E | | | | | | | | | P5E |
| (J) | | | | | | | | B0E | | B3E | | | B6E | | P14E | | B9E | | B12E | | I2E | | B0E | | |
| (K) | | | | | | | | B1E | | B4E | | | B7E | | | | B10E | | B13E | | | | B1E | | |
| (L) | | | I2E | B0E | B1E | P5E | B3E | B4E | P8E | B6E | B7E | P11E | B9E | B10E | P14E | B12E | B13E | I2E | B0E |

FIG.8

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| (A) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| (B) | B0 | B1 | I2 | B3 | B4 | P5 | B6 | B7 | P8 | B9 | B10 | P11 | B12 | B13 | P14 | B0 | B1 | I2 | B3 | B4 | P5 | B6 | B7 | P8 | B9 |
| (C) | | | I2 | | | | B0 | | | P8 | | | B6 | | | P14 | | | B12 | | | P5 | | | B3 |
| (D) | | | | | | | P5 | | | B3 | | | P11 | | | B9 | | | I2 | | | B0 | | | P8 |
| (E) | | | | | | | B1 | | | B4 | | | B7 | | | B10 | | | B13 | | | B1 | | | B4 |
| (F) | | | | | | | I2L | | | P5L | | | P8L | | | P11L | | | P14L | | | | | | | P5L |
| (G) | | | | | | | | | | | | | | | | | | | | | | | | | |
| (H) | | | | | | | | | | | | | | | | | | | | | I2L | | | | |
| (I) | | | | | | | I2E | | | P5E | | | P8E | | | P11E | | | P14E | | | I2E | | | P5E |
| (J) | | | | | | | | | | B0E | | | B3E | | | B6E | | | B9E | | | B12E | | | B0E |
| (K) | | | | | | | | | | B1E | | | B4E | | | B7E | | | B10E | | | B13E | | | B1E |
| (L) | | | | | | | | | | I2E | B0E | B1E | P5E | B3E | B4E | P8E | B6E | B7E | P11E | B9E | B10E | P14E | B12E | B13E | I2E |

IMAGE PROCESSING DEVICE AND IMAGE PROCESSING METHOD

FIELD

The present disclosure relates to an image processing device and an image processing method. Specifically, encoding for an image is enabled to be performed at high speed.

BACKGROUND

Along with advancements in the digital image techniques, advancements are being made in a technique for compression-encoding image data so as to correspond to an increasing amount of data. With the improvement in data processing capability, a complicated operation for the compression encoding is possible, and the compression ratio of the image data is being greatly increased. Specifically, as a compression encoding technique which is employed in satellite and terrestrial digital HDTV broadcasting, a compression encoding scheme called MPEG2 (Moving Picture Experts Group 2) is used. In addition, MPEG4 AVC/H.264 (hereinafter, referred to as "H.264/AVC"), which is one of the compression encoding schemes which have been standardized following MPEG2, has a compression ratio which is even more improved than MPEG2.

In order to perform the compression encoding at high speed, there has been proposed a method in which the encoding is performed in parallel by the use of a plurality of encoding units. For example, in the technique disclosed in JP-A-2002-199392, an image plane is divided into a plurality of regions, and the divided regions are respectively encoded in parallel. In the technique disclosed in JP-A-2008-66851, the encoding is performed in parallel with GOP units by using a closed GOP (closed Group Of Pictures) structure.

SUMMARY

In the case where an image plane is divided into regions, and the divided regions are respectively encoded in parallel, boundary parts of the divided regions are shown on an image. For example, when an intra prediction is performed in H.264/AVC, pixel data of a reference pixel may not be obtained in a macro block positioned at the boundary in some cases, and thus there is a problem in that an image where the boundary part is visible may be generated. In addition, since a deblocking filter may not be applied to the boundary part, a reference image (a locally decoded image) used for the inter-prediction becomes an image in which block distortion remains.

If the closed GOP structure is used, the compression ratio is reduced as compared with the use of an open GOP structure. In addition, since the encoding is performed in parallel with GOP units, a large-volume buffer for storing encoded bit streams with GOP units is necessary, and a delay in the encoding becomes a time corresponding to one GOP or more.

Thus, it is desirable to provide an image processing device and an image processing method capable of encoding images at high speed.

An embodiment of the present disclosure is directed to an image processing device including a plurality of encoding units that encode image data; a shared memory that stores reference image data which is used for encoding performed by each of the plurality of encoding units; and a control unit that secures an encoding unit from the plurality of encoding units, which is made to encode an intra-frame prediction encoded image and a forward prediction encoded image by priority, and that makes an encoding unit, which is not used to encode the intra-frame prediction encoded image and the forward prediction encoded image, encode a bidirectional prediction encoded image, using reference image data stored in the shared memory during a period where the secured encoding unit does not perform the encoding.

In the embodiment of the present disclosure, the plurality of encoding units that encode image data is provided. The shared memory that stores reference image data which is used for encoding performed by each of the plurality of encoding units is provided. The control unit alternately secures an encoding unit from, for example, two encoding units, and makes the encoding unit encode the intra-frame prediction encoded image and the forward prediction encoded image by priority. In addition, the control unit completes encoding for a bidirectional prediction encoded image between an intra-frame prediction encoded image and a forward prediction encoded image or between a forward prediction encoded image and a forward prediction encoded image, during a period from completion of the encoding for the intra-frame prediction encoded image or the forward prediction encoded image until the encoding unit which has performed the encoding encodes the next intra-frame prediction encoded image or the next forward prediction encoded image. For this, the number of the bidirectional prediction encoded images, the number of the encoding units, or the like is set, and an encoding unit which is not used to encode the intra-frame prediction encoded image or the forward prediction encoded image encodes a bidirectional prediction encoded image, using reference image data stored in the shared memory during a period in which the secured encoding unit does not perform the encoding.

Another embodiment of the present disclosure is directed to an image processing method including causing a plurality of encoding units to encode image data; causing a shared memory to store reference image data which is used for encoding performed by each of the plurality of encoding units; and causing a control unit to secure an encoding unit from the plurality of encoding units, which is made to encode an intra-frame prediction encoded image and a forward prediction encoded image by priority, and to make an encoding unit, which is not used to encode the intra-frame prediction encoded image and the forward prediction encoded image, encode a bidirectional prediction encoded image, using reference image data stored in the shared memory during a period where the secured encoding unit does not perform the encoding.

According to the embodiments of the present disclosure, a shared memory is provided, and an encoding unit which encodes image data performs encoding using reference image data stored in the shared memory. In addition, an encoding unit is secured from a plurality of encoding units so as to encode an intra-frame prediction encoded image and a forward prediction encoded image by priority. An encoding unit which is not used to encode the intra-frame prediction encoded image or the forward prediction encoded image encodes a bidirectional prediction encoded image using reference image data stored in the shared memory during a period where the secured encoding unit does not perform encoding. Therefore, it is possible to encode images at high speed. Since the encoding is sequentially performed for each image plane, boundary parts are not shown unlike the case of performing encoding in parallel for the respective regions into which an image plane is divided, and a large-volume buffer is not necessary unlike the case of performing encoding in parallel with GOP units. Further, it is possible to reduce latency as compared with the case of performing encoding in parallel with GOP units.

BRIEF DESCRIPTION OF THE DRAWINGS

FIG. 7 is a diagram illustrating a detailed operation example according to the second embodiment.

FIG. 8 is a diagram illustrating another detailed operation example according to the second embodiment.

DETAILED DESCRIPTION

Hereinafter, embodiments of the present disclosure will be described. In the present disclosure, reference image data is stored in a shared memory, and an encoding unit performs encoding using the reference image data stored in the shared memory. In addition, an encoding unit is secured from a plurality of encoding units, and encoding is performed by priority for an intra-frame prediction encoded image (hereinafter, referred to an "I picture") and a forward prediction encoded image (hereinafter, referred to as a "P picture"). Further, an encoding unit which is not used to encode the I picture or the P picture encodes a bidirectional prediction encoded image (hereinafter, referred to as a "B picture") using the reference image data stored in the shared memory during a period where the secured encoding unit does not encode the I picture or the P picture. In this way, it is possible to perform the encoding in parallel, and to sequentially process input image data. The description will be made in the following order.

1. First Embodiment (a case of two encoding units)
2. Second Embodiment (a case of three encoding units)
3. Case of Performing Encoding with Software

1. First Embodiment

Configuration According to First Embodiment

Figure 1:
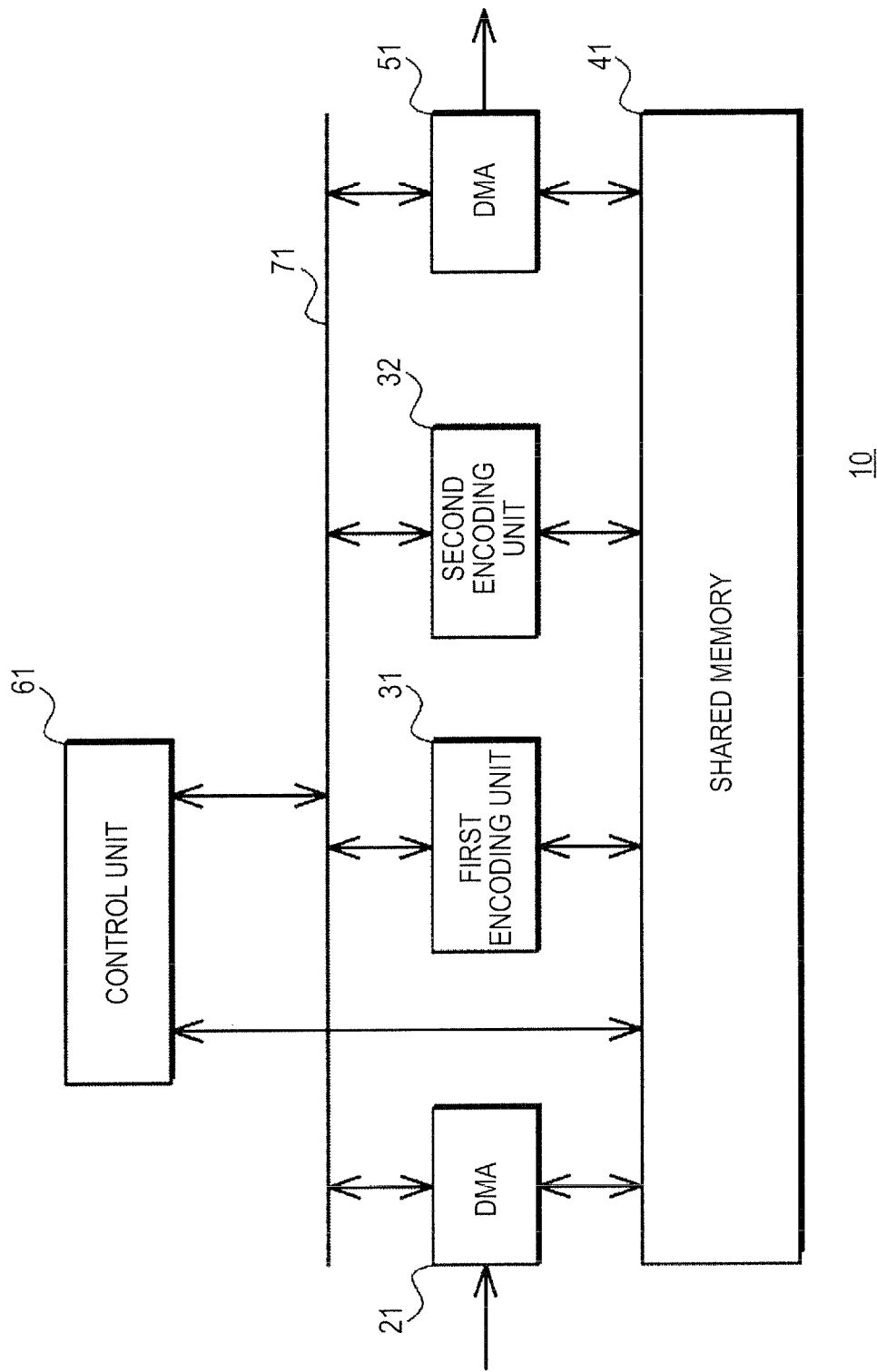
FIG. 1 is a diagram illustrating a configuration according to a first embodiment.

FIG. 1 is a diagram illustrating a configuration according to a first embodiment. An image processing device 10 includes DMAS 21 and 51, a first encoding unit 31, a second encoding unit 32, a shared memory 41, and a control unit 61. The DMAs 21 and 51, the first encoding unit 31, the second encoding unit 32, and the shared memory 41 are connected to the control unit 61 via a bus 71.

The DMA 21 writes input image data to be encoded to the shared memory 41 in response to a control signal from the control unit 61.

The first encoding unit 31 reads the input image data and performs encoding corresponding to a picture type indicated by a control signal in response to the control signal from the control unit 61. The first encoding unit 31 stores encoded data obtained through the encoding in the shared memory 41. The first encoding unit 31 stores reference image data which is to be used for encoding performed thereafter, in the shared memory 41. In addition, the first encoding unit 31 performs encoding using the reference image data stored in the shared memory 41 when the picture type indicated by the control signal is a type encoded using the reference image data.

The second encoding unit 32 reads the input image data and performs encoding corresponding to a picture type indicated by a control signal in response to the control signal from the control unit 61. The second encoding unit 32 stores encoded data obtained through the encoding in the shared memory 41. The second encoding unit 32 stores reference image data which is to be used for encoding performed thereafter, in the shared memory 41. In addition, the second encoding unit 32 performs encoding using the reference image data stored in the shared memory 41 when the picture type indicated by the control signal is a type encoded using the reference image data.

The DMA 51 reads the encoded data stored in the shared memory and outputs the read data from the image processing device 10 in response to a control signal from the control unit 61.

The control unit 61 supplies control signals to the DMAs 21 and 51, the first encoding unit 31, and the second encoding unit 32 so as to control operations of the units. The control unit 61 makes the first encoding unit 31 and the second encoding unit 32 perform encoding in parallel using the shared memory 41, thereby performing the encoding for input image data at high speed.

[Operation According to First Embodiment]

Figure 2:
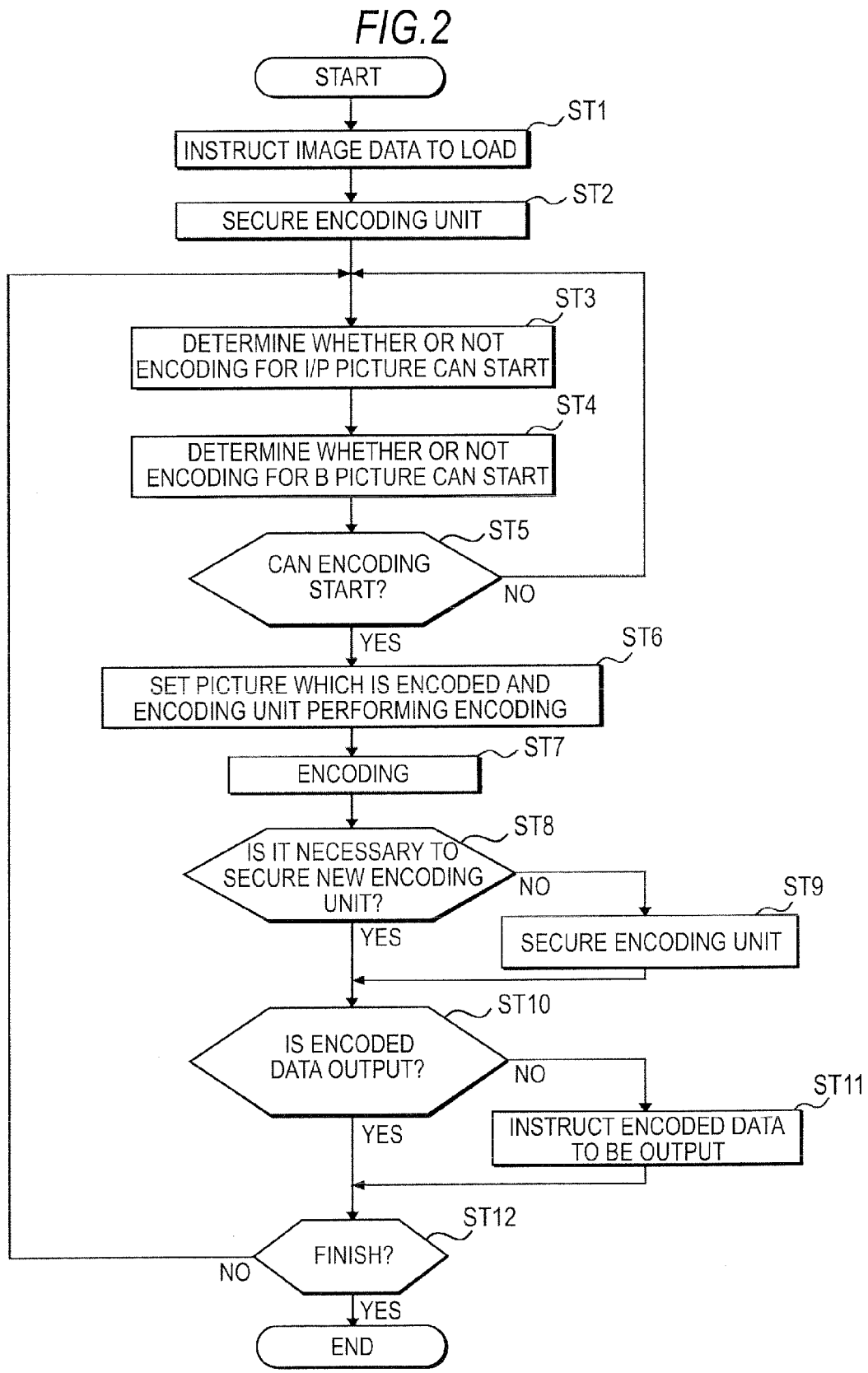
FIG. 2 is a flowchart illustrating an operation according to the first embodiment.

FIG. 2 is a flowchart illustrating an operation according to the first embodiment.

In step ST1, the control unit 61 instructs image data to be loaded. The control unit 61 supplies a control signal indicating the instruction for the loading of image data, to the DMA 21. The DMA 21 performs an operation responding to the control signal and stores the input image data in the shared memory 41.

In step ST2, the control unit 61 secures an encoding unit which encodes an I picture or a P picture. The control unit 61 secures an encoding unit which encodes an I picture or a P picture from a plurality of encoding units, and the flow goes to step ST3.

In step ST3, the control unit 61 determines whether or not it is possible to start encoding for an I picture or a P picture. The control unit 61 determines that it is possible to start the encoding when an image to be encoded is stored in the shared memory 41 as the I picture or the P picture. The control unit 61 determines that the encoding does not start when an image to be encoded is not stored in the shared memory 41 as the I picture or the P picture, and the flow goes to step ST4. In addition, the control unit 61 determines that the encoding does not start when reference image data which is used to encode the P picture is not stored in the shared memory 41, and the flow goes to step ST4.

In step ST4, the control unit 61 determines whether or not it is possible to start encoding for a B picture. The control unit 61 determines that it is possible to start the encoding for a B picture if the following conditions are satisfied. On the other hand, if the conditions are not satisfied, it is determined that it is not possible to start the encoding, and the flow goes to step ST5.

Reference image data used to encode the B picture is stored in the shared memory 41.

An encoding unit which does not perform the encoding exists.

The encoding unit which does not perform encoding is not an encoding unit which is secured to encode the I picture or the P picture by priority. Alternately, even the secured encoding unit may finish encoding for the B picture before starting encoding for the next I picture or the next P picture.

In step ST5, the control unit 61 determines whether or not it is possible to start encoding. If the control unit 61 determines that it is possible to start the encoding in step ST3 or ST4, the flow goes to step ST6. In addition, the control unit 61 performs the process in step ST3 if the encoding does not start.

In step ST6, the control unit 61 sets a picture which undergoes encoding and an encoding unit which performs the encoding. The control unit 61 sets the secured encoding unit to encode the I picture or the P picture when it is possible to start the encoding for the I picture or the P picture. In addition, the control unit 61 sets an encoding unit which encodes the B picture when it is possible to start the encoding for the B picture, and the flow goes to step ST7.

In step ST7, the control unit 61 makes the encoding unit set in step ST6 encode the picture, and the flow goes to step ST8.

In step ST8, the control unit 61 determines whether or not it is necessary to secure a new encoding unit. The control unit 61 determines that it is necessary to secure a new encoding unit when the I picture or the P picture has been encoded, and the flow goes to step ST9. In addition, the control unit 61 performs a process in step ST10 when the I picture or the P picture is not encoded.

In step ST9, the control unit 61 secures the encoding unit. The control unit 61 secures encoding units, for example, so as to alternately use two encoding units. In other words, when the control unit 61 has firstly secured the first encoding unit 31 so as to encode the I picture or the P picture, it secondly secures the second encoding unit 32 so as to encode the I picture or the P picture. Further, when the control unit 61 has secured the second encoding unit 32 so as to encode the I picture or the P picture, it then secures the first encoding unit 31 so as to encode the I picture or the P picture. In this way, the control unit 61 alternately secures the two encoding units, and the flow goes to step ST10.

In step ST10, the control unit 61 determines whether or not encoded data is output. The control unit 61 performs a process in step ST11 when the encoded data is not output, and performs a process in step ST12 when the encoded data is output.

In step ST11, the control unit 61 instructs the encoded data to be output. The control unit 61 supplies a control signal indicating an instruction for outputting encoded data, to the DMA 51. The DMA 51 performs an operation responding to the control signal and outputs the encoded data stored in the shared memory 41, and the flow goes to step ST12.

In step ST12, the control unit 61 determines whether or not the encoding is finished. The control unit 61 performs the process in the step ST3, for example, when a user operation for finishing the encoding is not performed or when image data continues to be input. In addition, the control unit 61 finishes the encoding, for example, when a user operation for finishing the encoding is performed or when image data finishes being input.

Figure 3:
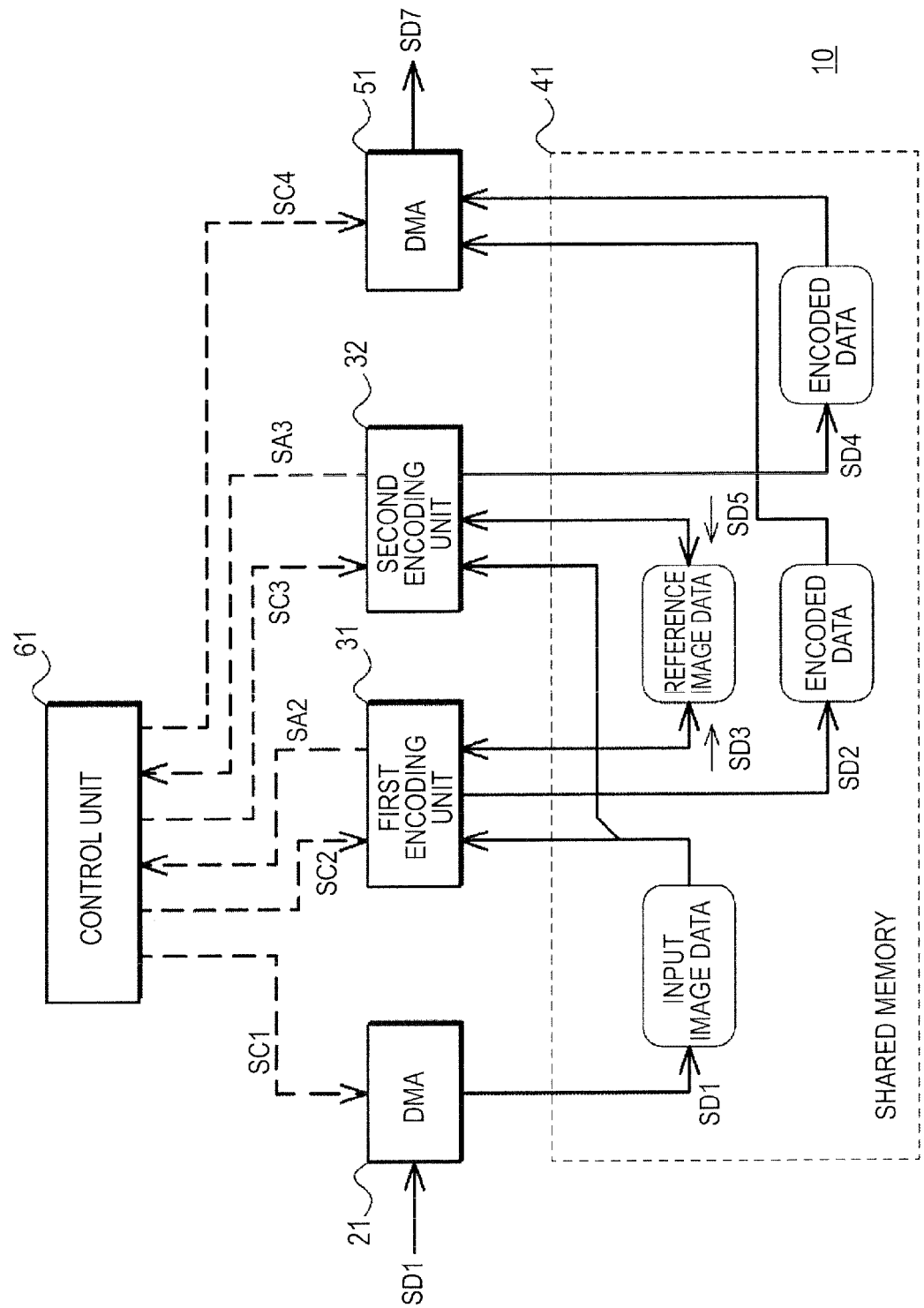
FIG. 3 is a diagram illustrating the flow of control signals and data.

FIG. 3 shows the flow of control signals and data in the image processing device 10. The control unit 61 outputs the control signal SC1 indicating an instruction for loading image data to the DMA 21. The DMA 21 performs an operation responding to the control signal SC1 and stores the input image data SD1 in the shared memory 41.

The control unit 61 alternately uses the first encoding unit 31 and the second encoding unit 32 so as to encode the I picture and the P picture by priority. In addition, the B picture is encoded by the encoding unit which is not secured to encode the I picture or the P picture of the first encoding unit 31 and the second encoding unit 32, during a period where the secured encoding unit does not perform encoding.

The control unit 61 initially secures the first encoding unit 31, and, for example, when it is possible to start the encoding for the I picture, outputs a control signal SC2, which enables the I picture to be encoded using the input image data stored in the shared memory 41, to the first encoding unit 31.

The first encoding unit 31 encodes the I picture using the input image data stored in the shared memory 41, and stores the encoded data SD2 and the reference image data SD3 in the shared memory 41. In addition, the first encoding unit 31 outputs the completion notification signal SA2 indicating that the encoding is completed, to the control unit 61.

The control unit 61 secures the second encoding unit 32 after the I picture is encoded. When it is possible to start encoding for the P picture, the control unit 61 outputs the control signal SC3, which enables the P picture to be encoded using the input image data and the reference image data stored in the shared memory 41, to the second encoding unit 32.

The second encoding unit 32 encodes the P picture using the input image data SD1 stored in the shared memory 41 and the reference image data stored in the shared memory 41. The second encoding unit 32 stores the encoded data SD4 generated through the encoding, and the reference image data SD5 which can be used for encoding performed thereafter, in the shared memory 41. In addition, the second encoding unit 32 outputs the completion notification signal SA3 indicating that the encoding is completed, to the control unit 61.

Thereafter, the control unit 61 alternately secures the first encoding unit 31 and the second encoding unit 32, and makes them encode an I picture or a P picture by priority when it is possible to start the encoding for the I picture or the P picture.

The control unit 61 makes the encoding unit different from the encoding unit used to encode the next I picture or the next P picture, encode the B picture using the input image data and the reference image data. In addition, the control unit 61 makes the secured encoding unit encode the B picture when the encoding can be finished before encoding for the next I picture or the next P picture starts even if the encoding unit is that used to encode the next I picture or the next P picture. The encoding unit stores encoded data generated through the encoding in the shared memory 41.

The control unit 61 outputs the control signal SC4 indicating an instruction for outputting the encoded data to the DMA 51. The DMA 51 performs an operation responding to the control signal SC4, reads the encoded data from the shared memory 41, and outputs the encoded bit stream SD7.

Figure 4:
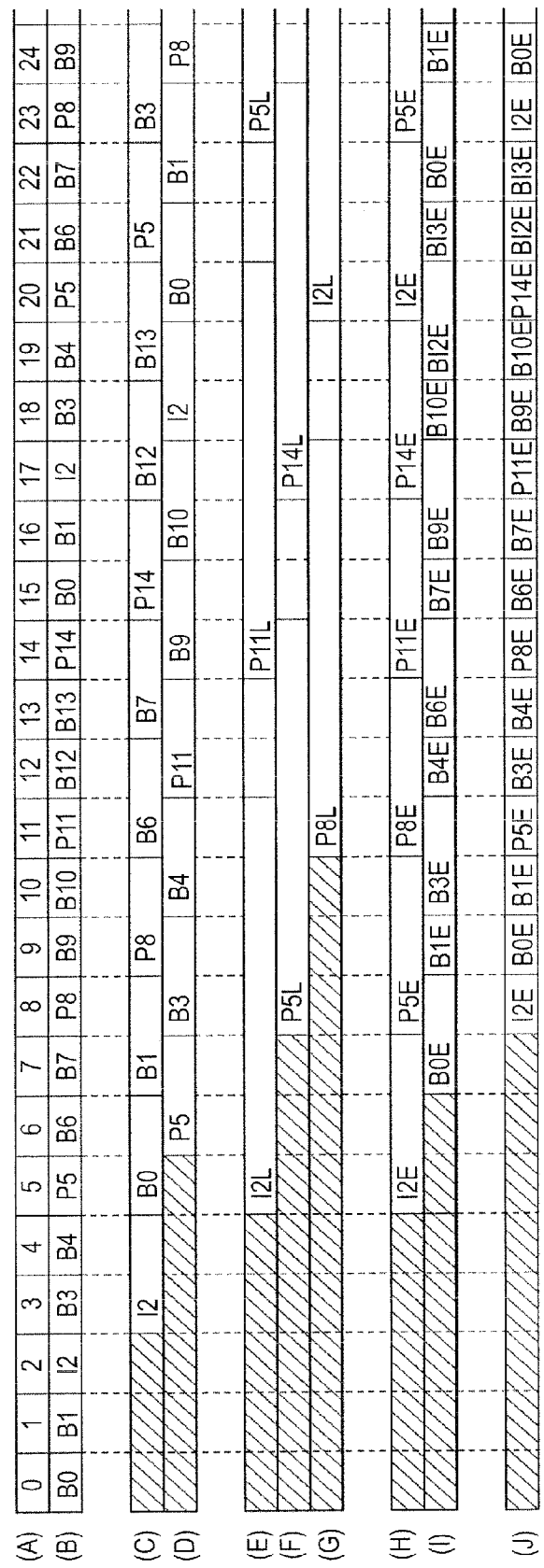
FIG. 4 is a diagram illustrating a detailed operation example according to the first embodiment.

FIG. 4 shows a detailed operation example according to the first embodiment. FIG. 4 shows a case where a two-frame period is necessary to encode one picture in the image processing device 10. In addition, there are cases where encoding conditions are M (a cycle of the I and P pictures)=3, and N (the number of pictures in one GOP)=14 in a progressive method.

A of FIG. 4 shows frame numbers. B of FIG. 4 shows input image data. C of FIG. 4 shows encoding in the first encoding unit 31. D of FIG. 4 shows encoding in the second encoding unit 32. E, F, and G of FIG. 4 show reference image data. H and I of FIG. 4 show encoded data. J of FIG. 4 shows encoded data to be output.

During frame 0, the DMA 21 stores the image data B0 for the B picture in the shared memory 41. During frame 1, the DMA 21 stores the image data B1 for the B picture in the shared memory 41. During frame 2, the DMA 21 stores the image data I2 for the I picture in the shared memory 41. The control unit 61 does not start encoding for the B picture during the periods of frames 0 to 2 since reference image data is not stored in the shared memory 41.

During frame 3, the DMA 21 stores the image data B3 for the B picture in the shared memory 41. The control unit 61 makes the I picture be encoded by priority since the image data I2 for the I picture is stored in the shared memory 41 during frame 2. The control unit 61 secures, for example, the first encoding unit 31, and makes the first encoding unit 31 encode the image data I2. For this reason, the first encoding unit 31 encodes the image data I2 using the two-frame period of frames 3 and 4, and stores the encoded data I2E and the reference image data I2L in the shared memory 41. The control unit 61 secures the second encoding unit 32 so as to encode the next I picture or the next P picture when the encoding for the image data I2 is completed.

During frame 4, the DMA 21 stores the image data B4 for the B picture in the shared memory 41. The control unit 61 does not start encoding for the B picture since reference image data is not stored in the shared memory 41.

During frame 5, the DMA 21 stores the image data P5 for the P picture in the shared memory 41. In addition, during frame 5, the reference image data I2L is stored in the shared memory 41, and the encoding for the image data B0 and B1 for the B picture is possible using the reference image data I2L. Further, during frame 5, since the encoding for the I picture is completed, the encoding can be performed by the first encoding unit 31 and the second encoding unit 32. When the image data P5 for the P picture is stored in the shared memory 41, the control unit 61 makes the secured second encoding unit 32 encode the image data P5 for the P picture by priority during the next frame. Here, if the second encoding unit 32 is selected to encode the image data B0 for the B picture, the periods up to frame 6 are necessary to encode the image data B0, and thus the image data P5 for the P picture may not be encoded by priority. Therefore, the control unit 61 selects the first encoding unit 31 so as to encode the image data B0. In other words, the first encoding unit 31 encodes the image data B0 using the two-frame period of frames 5 and 6, and stores the encoded data B0E generated through the encoding for the image data B0 in the shared memory 41.

During frame 6, the DMA 21 stores the image data B6 for the B picture in the shared memory 41. The control unit 61 makes the P picture be encoded by priority since the image data P5 for the P picture is stored in the shared memory 41 during frame 5. The control unit 61 makes the secured second encoding unit 32 encode the image data P5. For this reason, the second encoding unit 32 encodes the image data P5 using the two-frame period of frames 6 and 7, and stores the reference image data P5L and the encoded data P5E generated through the encoding in the shared memory 41. The control unit 61 secures the first encoding unit 31 so as to encode the next I picture or the next P picture when the encoding for the image data P5 is completed.

During frame 7, the DMA 21 stores the image data B7 for the B picture in the shared memory 41. In addition, during frame 7, the reference image data I2L is stored in the shared memory 41, and the encoding for the image data B1 for the B picture is possible using the reference image data I2L. In addition, during frame 7, since the encoding for the image data B0 is completed, the first encoding unit 31 can perform encoding. Here, the first encoding unit 31 encodes image data for the P picture by priority during frame 9, and the first encoding unit 31 can encode the image data B1 for the B picture during frames 7 and 8. Therefore, the control unit 61 selects the first encoding unit 31 so as to encode the image data B1 for the B picture. In other words, the first encoding unit 31 encodes the image data B1 using the two-frame period of frames 7 and 8, and stores the encoded data B1E generated through the encoding for the image data B1 in the shared memory 41.

During frame 8, the DMA 21 stores the image data P8 for the P picture in the shared memory 41. In addition, during frame 8, the reference image data I2L and P5L are stored in the shared memory 41, and the encoding for the image data B3 and B4 for the B picture is possible using the reference image data I2L and P5L. In addition, during frame 8, since the encoding for the image data P5 is completed, the encoding can be performed by the second encoding unit 32. Here, the second encoding unit 32 encodes image data for the P picture by priority during frame 12, and the second encoding unit 32 can encode the image data B3 for the B picture during frames 8 and 9. Therefore, the control unit 61 selects the second encoding unit 32 so as to encode the image data B3 for the B picture. In other words, the second encoding unit 32 encodes the image data B3 using the two-frame period of frames 8 and 9, and stores the encoded data B3E generated through the encoding for the image data B3 in the shared memory 41.

During frame 9, the DMA 21 stores the image data B9 for the B picture in the shared memory 41. The control unit 61 makes the P picture be encoded by priority since the image data P8 for the P picture is stored in the shared memory 41 during frame 8. The control unit 61 makes the secured first encoding unit 31 encode the image data P8. For this reason, the first encoding unit 31 encodes the image data P8 using the two-frame period of frames 9 and 10, and stores the encoded data P8E and the reference image data P8L in the shared memory 41. During frame 9, since the encoding is performed by the first encoding unit 31 and the second encoding unit 32, the control unit 61 does not start encoding for a new picture. In addition, the control unit 61 secures the second encoding unit 32 so as to encode a next I picture or a next P picture when the encoding for the image data P8 is completed.

During frame 10, the DMA 21 stores the image data B10 for the B picture in the shared memory 41. In addition, during frame 10, the reference image data I2L and P5L are stored in the shared memory 41, and the encoding for the image data B4 for the B picture is possible using the reference image data I2L and P5L. Since the encoding for the image data B3 is completed during frame 9, the second encoding unit 32 can perform encoding. Here, the second encoding unit 32 encodes image data for the P picture by priority during frame 12, and the second encoding unit 32 can encode the image data B4 for the B picture during frames 10 and 11. Therefore, the control unit 61 selects the second encoding unit 32 so as to encode the image data B4 for the B picture. In other words, the second encoding unit 32 encodes the image data B4 using the two-frame period of frames 10 and 11, and stores the encoded data B4E generated through the encoding for the image data B4 in the shared memory 41.

In the same manner hereinafter, the encoding unit used to encode an I picture or a P picture is alternately changed to the first encoding unit 31 and the second encoding unit 32, and the I picture or the P picture is encoded by priority. In addition, reference image data generated through the encoding for the I picture or the P picture is stored in the shared memory 41. The B picture is encoded using the reference image data stored in the shared memory 41 by the encoding unit which does not encode the I picture or the P picture, during a period where the secured encoding unit does not perform the encoding.

When the encoding is performed in this way, the encoded data is stored in the shared memory 41 as shown in H and J of FIG. 4. Therefore, the control unit 61 controls the DMA 51 to read the encoded data in the order of the encoded data I2E, B0E, B1E, P5E, . . . , for example, from frame 8. By reading the encoded data in this way, it is possible to output an encoded bit stream obtained through the encoding for the input image data from the image processing device 10.

Thereby, since the first encoding unit 31 and the second encoding unit 32 can perform the encoding in parallel using the reference image data stored in the shared memory, it is possible to perform the encoding at high speed. In addition, in the case where the cycle M of the I and P pictures is 3 and a period necessary for one encoding is a two-frame period such as in the first embodiment, the first encoding unit 31 and the second encoding unit 32 are alternately used as shown in FIG. 4, and the I picture and the P picture are encoded by priority. In addition, if encoding for two B pictures is performed using a period where a secured encoding unit does not perform encoding, and an encoding unit which is not secured, it is possible to sequentially encode input image data. Since the encoding is sequentially performed for each image plane, there is no case where boundary parts are shown unlike the case of performing encoding in parallel for the respective regions into which an image plane is divided, and a large-volume buffer is not necessary unlike the case of performing encoding in parallel with GOP units. Further, it is possible to reduce latency as compared with the case of performing encoding in parallel with GOP units. In addition, if a memory is provided separately for each encoding unit, it is necessary to select a memory for storing reference image data or the like depending on which encoding unit encodes a picture and which picture is encoded by an encoding unit. However, in the present disclosure, the shared memory 41 stores reference image data or input image data and encoded data, and thus the process is easily performed since it is not necessary to select a memory or the like.

2. Second Embodiment

Configuration According to Second Embodiment

Figure 5:
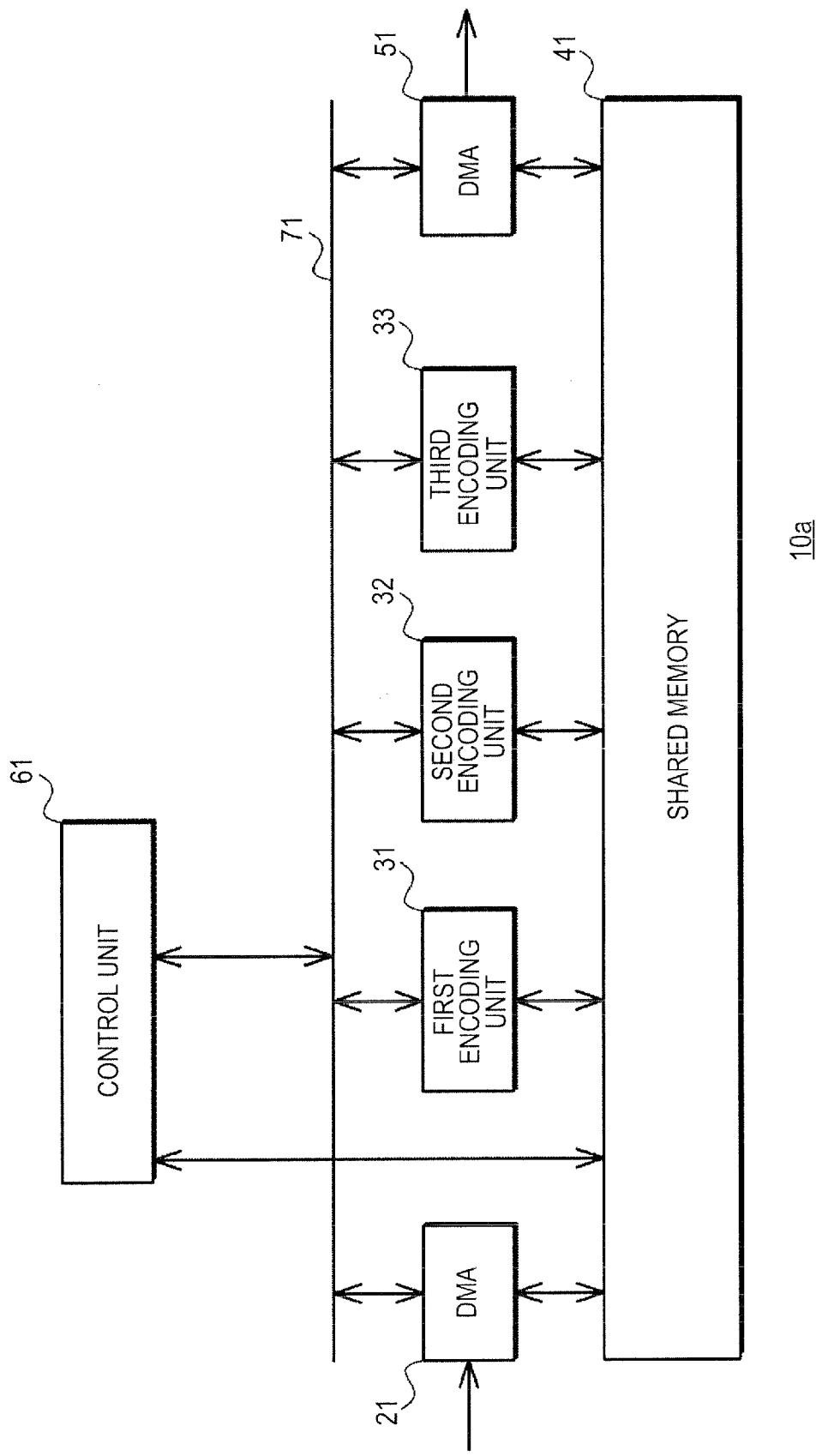
FIG. 5 is a diagram illustrating a configuration according to a second embodiment.

The second embodiment corresponds to a case of using three encoding units. FIG. 5 is a block diagram illustrating a configuration according to the second embodiment. An image processing device 10a includes DMAs 21 and 51, a first encoding unit 31, a second encoding unit 32, a third encoding unit 33, a shared memory 41, and a control unit 61. The DMAs 21 and 51, the first encoding unit 31, the second encoding unit 32, the third encoding unit 33, and the shared memory 41 are connected to the control unit 61 via a bus 71.

The DMA 21 writes input image data to be encoded to the shared memory 41 in response to a control signal from the control unit 61.

The first encoding unit 31 reads the input image data and performs encoding corresponding to a picture type indicated by a control signal in response to the control signal from the control unit 61. The first encoding unit 31 stores encoded data obtained through the encoding in the shared memory 41. The first encoding unit 31 stores reference image data which is to be used for encoding performed thereafter, in the shared memory 41. In addition, the first encoding unit 31 performs encoding using the reference image data stored in the shared memory 41 when the picture type indicated by the control signal is a type encoded using the reference image data.

The second encoding unit 32 reads the input image data and performs encoding corresponding to a picture type indicated by a control signal in response to the control signal from the control unit 61. The second encoding unit 32 stores encoded data obtained through the encoding in the shared memory 41. The second encoding unit 32 stores reference image data which is to be used for encoding performed thereafter, in the shared memory 41. In addition, the second encoding unit 32 performs encoding using the reference image data stored in the shared memory 41 when the picture type indicated by the control signal is a type encoded using the reference image data.

The third encoding unit 33 reads the input image data and performs encoding corresponding to a picture type indicated by a control signal in response to the control signal from the control unit 61. The third encoding unit 33 stores encoded data obtained through the encoding in the shared memory 41. In addition, the third encoding unit 33 performs encoding using the reference image data stored in the shared memory 41.

The DMA 51 reads the encoded data stored in the shared memory and outputs the read data from the image processing device 10a in response to a control signal from the control unit 61.

The control unit 61 supplies control signals to the DMAs 21 and 51, the first encoding unit 31, the second encoding unit 32, and the third encoding unit 33 so as to control operations of the units. The control unit 61 makes the first encoding unit 31, the second encoding unit 32, and the third encoding unit 33 perform encoding in parallel using the shared memory 41, thereby encoding input image data at high speed.

[Operation of Image Processing Device]

The image processing device 10a performs the operation in the flowchart shown in FIG. 2 in the same manner as the image processing device 10. In the image processing device 10a provided with the three encoding units, an I picture or a P picture is encoded by priority by alternately using the first encoding unit 31 and the second encoding unit 32. In addition, a B picture is encoded using the encoding unit of the first encoding unit 31 and the second encoding unit 32 which is not used to encode the I picture or the P picture, a period where a secured encoding unit does not perform the encoding, and the third encoding unit 33.

Figure 6:
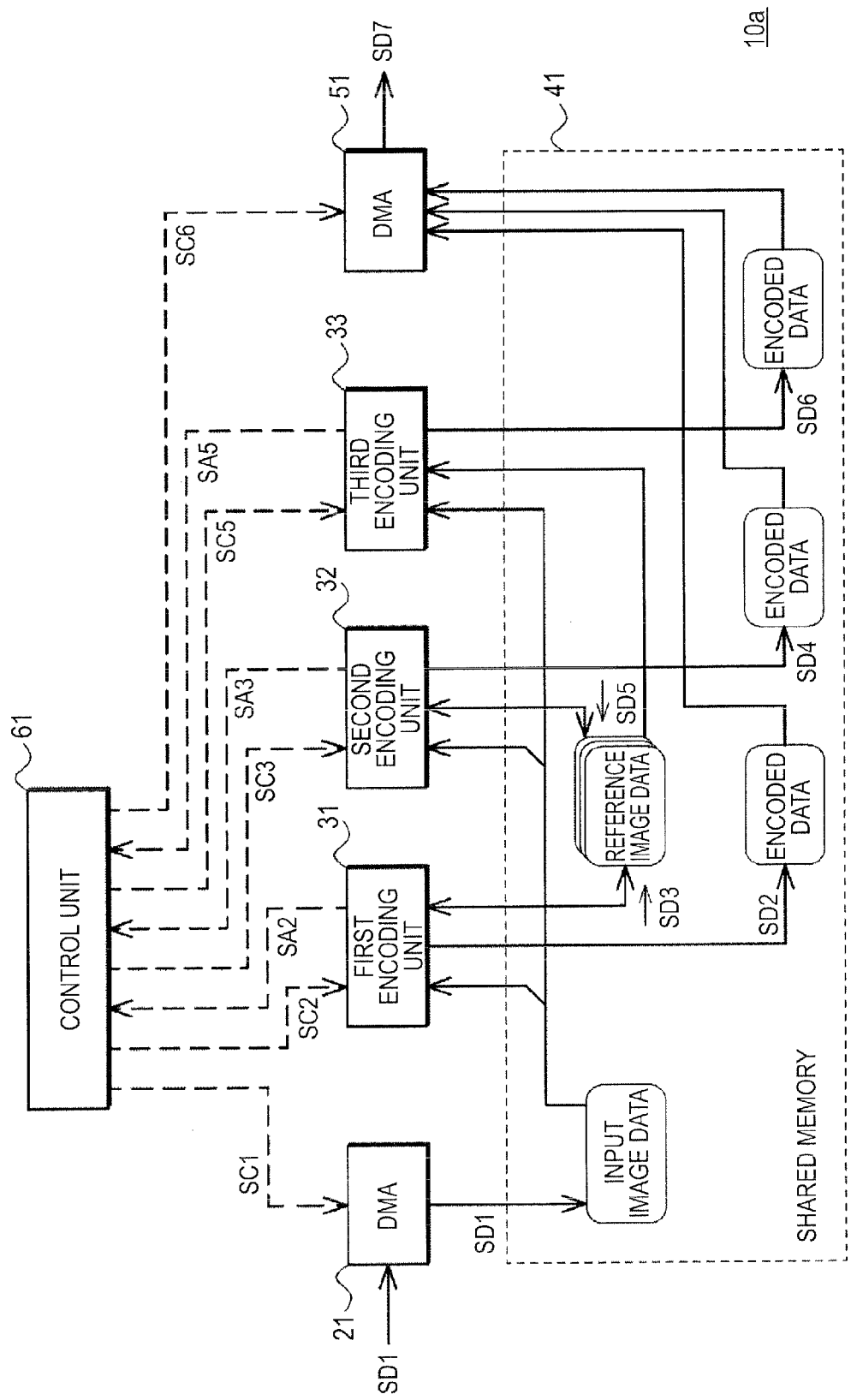
FIG. 6 is a diagram illustrating the flow of control signals and data.

FIG. 6 shows the flow of control signals and data in the image processing device 10a. The control unit 61 outputs the control signal SC1 indicating an instruction for loading of image data to the DMA 21. The DMA 21 performs an operation responding to the control signal SC1 and stores the input image data SD1 in the shared memory 41.

The control unit 61 alternately uses the first encoding unit 31 and the second encoding unit 32 so as to encode the I picture and the P picture by priority. In addition, the B picture is encoded using a non-encoding period where the encoding for the I picture or the P picture is not performed in the first encoding unit 31 or the second encoding unit 32, and the third encoding unit 33.

The control unit 61 initially secures the first encoding unit 31, and, for example, when it is possible to start the encoding for the I picture, outputs a control signal SC2, which enables the I picture to be encoded using the input image data stored in the shared memory 41, to the first encoding unit 31.

The first encoding unit 31 encodes the I picture using the input image data stored in the shared memory 41, and generates and stores the encoded data SD2 and the reference image data SD3 in the shared memory 41. In addition, the first encoding unit 31 outputs the completion notification signal SA2 indicating that the encoding is completed, to the control unit 61.

The control unit 61 secures the second encoding unit 32 after the I picture is encoded. When it is possible to start the encoding for the P picture, the control unit 61 outputs the control signal SC3, which enables the P picture to be encoded using the input image data and the reference image data stored in the shared memory 41, to the second encoding unit 32.

The second encoding unit 32 encodes the P picture using the input image data SD1 stored in the shared memory 41 and the reference image data stored in the shared memory 41, and stores the encoded data SD4 and the reference image data SD5 in the shared memory 41. In addition, the second encoding unit 32 outputs the completion notification signal SA3 indicating that the encoding is completed, to the control unit 61.

The control unit 61 selects, for example, the third encoding unit 33 when it is possible to start the encoding for the B picture. The control unit 61 outputs the control signal SC5, which enables the B picture to be encoded using the input image data and the reference image data stored in the shared memory 41, to the third encoding unit 33.

The third encoding unit 33 encodes the B picture using the input image data SD1 stored in the shared memory 41 and the reference image data stored in the shared memory 41, and generates and stores the encoded data SD6 in the shared memory 41. In addition, the third encoding unit 33 outputs the completion notification signal SA5 indicating that the encoding is completed, to the control unit 61.

The control unit 61 makes the first encoding unit 31 or the second encoding unit 32, which are secured alternately, perform the encoding by priority when it is possible to start the encoding for the I picture or the P picture. In addition, the control unit 61 makes the encoding unit different from the encoding unit used to encode the next I picture or the next P picture, encode the B picture using the input image data and the reference image data, and stores encoded data which is generated through the encoding in the shared memory 41. The control unit 61 makes the secured encoding unit encode the B picture when even the encoding unit used to encode the next I picture or the next P picture can finish the encoding before the encoding for the next I picture or the next P picture starts. The control unit 61 stores encoded data which is generated through the encoding for the B picture in the shared memory 41. In other words, the control unit 61 performs the encoding using the first encoding unit 31 or the second encoding unit 32 as well as using the third encoding unit 33 in the case where the encoding can be completed before starting the encoding for the next I picture or the next P picture.

The control unit 61 outputs the control signal SC6 indicating an instruction for outputting of the encoded data to the DMA 51. The DMA 51 performs an operation responding to the control signal SC6, reads the encoded data from the shared memory 41, and outputs the encoded bit stream SD7.

FIG. 7 shows a detailed operation example according to the second embodiment. FIG. 7 shows a case where the two-frame period is necessary to encode one picture in the image processing device 10a. In addition, there are cases where encoding conditions are M=3, and N=14 in the progressive method.

A of FIG. 7 shows frame numbers. B of FIG. 7 shows input image data. C of FIG. 7 shows encoding in the first encoding unit 31. D of FIG. 7 shows encoding in the second encoding unit 32. E of FIG. 7 shows encoding in the third encoding unit 33. F, G, and H of FIG. 7 show reference image data. I, J, and K of FIG. 7 show encoded data. L of FIG. 7 shows encoded data to be output.

During frame 0, the DMA 21 stores image data B0 for the B picture in the shared memory 41. During frame 1, the DMA 21 stores the image data B1 for the B picture in the shared memory 41. During frame 2, the DMA 21 stores the image data I2 for the I picture in the shared memory 41. The control unit 61 does not start the encoding for the B picture during the periods of frames 0 to 2 since reference image data is not stored in the shared memory 41.

During frame 3, the DMA 21 stores the image data B3 for the B picture in the shared memory 41. The control unit 61 makes the I picture be encoded by priority since the image data I2 for the I picture is stored in the shared memory 41 during frame 2. The control unit 61 secures, for example, the first encoding unit 31, and makes the first encoding unit 31 encode the image data I2. For this reason, the first encoding unit 31 encodes the image data I2 using the two-frame period of frames 3 and 4, and stores the encoded data I2E and the reference image data I2L in the shared memory 41. The control unit 61 secures the second encoding unit 32 so as to encode the next picture or the next P picture when the encoding for the image data I2 is completed.

During frame 4, the DMA 21 stores the image data B4 for the B picture in the shared memory 41. The control unit 61 does not start the encoding for the B picture since reference image data is not stored in the shared memory 41.

During frame 5, the DMA 21 stores the image data P5 for the P picture in the shared memory 41. In addition, during frame 5, the reference image data I2L is stored in the shared memory 41, and the encoding for the image data B0 and B1 for the B picture is possible using the reference image data I2L. Further, during frame 5, since the encoding for the I picture is completed, the encoding can be performed by the first encoding unit 31, the second encoding unit 32, and the third encoding unit 33. When the image data P5 for the P picture is stored in the shared memory 41, the control unit 61 makes the secured second encoding unit 32 encode the image data P5 for the P picture by priority from the next frame. Here, if the second encoding unit 32 is selected to encode the image data for the B picture, the periods up to frame 6 are necessary to encode the image data, and thus the image data P5 for the P picture may not be encoded by priority. Therefore, the control unit 61 selects the first encoding unit 31 and the third encoding unit 33 so as to encode the image data B0 and B1. In other words, the first encoding unit 31 encodes the image data B0 using the two-frame period of frames 5 and 6, and stores the encoded data B0E generated through the encoding for the image data B0 in the shared memory 41. Further, the third encoding unit 33 encodes the image data B1 using the two-frame period of frames 5 and 6, and stores the encoded data B1E generated through the encoding for the image data B1 in the shared memory 41.

During frame 6, the DMA 21 stores the image data B6 for the B picture in the shared memory 41. The control unit 61 makes the P picture be encoded by priority since the image data P5 for the P picture is stored in the shared memory 41 during frame 5. The control unit 61 makes the secured second encoding unit 32 encode the image data P5. For this reason, the second encoding unit 32 encodes the image data P5 using the two-frame period of frames 6 and 7, and stores the encoded data P5E and the reference image data P5L in the shared memory 41. The control unit 61 secures the first encoding unit 31 so as to encode the next I picture or the next P picture when the encoding for the image data P5 is completed.

During frame 7, the DMA 21 stores the image data B7 for the B picture in the shared memory 41. In addition, during frame 7, the encoding for the image data B0 for the B picture is completed by the first encoding unit 31, and the encoding for the image data B1 for the B picture is completed by the third encoding unit 33. However, the reference image data P5L used to encode the image data B3 and B4 for the B picture is not stored in the shared memory 41. Therefore, the control unit 61 does not start the encoding for the B picture.

During frame 8, the DMA 21 stores the image data P8 for the P picture in the shared memory 41. In addition, during frame 8, since the reference image data I2L and P5L are stored in the shared memory 41, the encoding for the image data B3 and B4 for the B picture is possible using the reference image data I2L and P5L. In addition, during frame 8, since the encoding for the image data P5 is completed, the encoding can be performed by the first encoding unit 31, the second encoding unit 32, and the third encoding unit 33. Here, during frame 9, encoding for the next P picture can be started by the first encoding unit 31 which is different from the second encoding unit 32 which has encoded the image data P5. Therefore, if the first encoding unit 31 encodes the B picture from frame 8, the P picture may not be encoded by priority. In addition, during frame 12, encoding for the next P picture can be started by the second encoding unit 32 which has encoded the image data P5. Therefore, the control unit 61 selects the second encoding unit 32 and the third encoding unit 33 so as to encode the image data B3 and B4. For this reason, the second encoding unit 32 encodes the image data B3 using the two-frame period of frames 8 and 9, and stores the encoded data B3E in the shared memory 41. In addition, the third encoding unit 33 encodes the image data B4 using the two-frame period of frames 8 and 9, and stores the encoded data B4E in the shared memory 41.

During frame 9, the DMA 21 stores the image data B9 for the B picture in the shared memory 41. The control unit 61 makes the first encoding unit 31 encode the image data P8 for the P picture by priority since the image data P8 for the P picture is stored in the shared memory 41 during frame 8. For this reason, the first encoding unit 31 encodes the image data P8 using the two-frame period of frames 9 and 10, and stores the encoded data P8E and the reference image data P8L in the shared memory 41. In addition, the control unit 61 secures the second encoding unit 32 so as to encode the next I picture or the next P picture when the encoding for the image data P8 is completed.

During frame 10, the DMA 21 stores the image data B10 for the B picture in the shared memory 41. In addition, during frame 10, the encoding for the image data B3 for the B picture is completed by the second encoding unit 32, and the encoding for the image data B4 for the B picture is completed by the third encoding unit 33. However, the reference image data P8L used to encode the image data B6 and B7 for the B picture is not stored in the shared memory 41. Therefore, the control unit 61 does not start encoding for the B picture.

In the same manner hereinafter, the encoding unit used to encode an I picture or a P picture is alternately changed to the first encoding unit 31 and the second encoding unit 32. In addition, reference image data generated through the encoding for the I picture or the P picture is stored in the shared memory 41. The control unit 61 encodes a B picture using the reference image data stored in the shared memory 41 by the encoding unit which does not encode the I picture or the P picture of the first encoding unit 31 and the second encoding unit 32, during a period where the secured encoding unit does not perform the encoding, and by the third encoding unit 33.

The encoding is performed in this way, and thus the encoded data is stored in the shared memory 41 as shown in I, J, and K of FIG. 7. Therefore, the control unit 61 controls the DMA 51 to read the encoded data in an order of the encoded data I2E, B0E, B1E, P5E, . . . , for example, from frame 7. By reading the encoded data in this way, it is possible to output an encoded bit stream obtained through the encoding for the input image data from the image processing device 10*a*.

Thereby, since the first encoding unit 31, the second encoding unit 32, and the third encoding unit 33 can perform the encoding in parallel using the reference image data stored in the shared memory, it is possible to perform the encoding at high speed. In addition, in the case where the cycle M of the I and P pictures is 3 and a period necessary for one encoding is a two-frame period such as in the second embodiment, the first encoding unit 31 and the second encoding unit 32 are alternately used as shown in FIG. 7, and the I picture and the P picture are encoded by priority. In addition, each encoding unit encodes two B pictures using the non-encoding period where the encoding is not performed or the third encoding unit 33. In this way, it is possible to sequentially encode input image data.

In addition, in the case of using the three encoding units, it is possible to encode two pictures at the same time as described above. If the cycle M of the I and P pictures is 3, there is a six-frame period until the encoding unit which has encoded an I picture or a P picture encodes the next I picture or the next P picture. Therefore, even if a period necessary for the encoding unit to perform the encoding is a three-frame period, it is possible to sequentially encode the input image data.

FIG. 8 is a diagram illustrating another detailed operation according to the second embodiment, and shows a case where a period necessary for encoding is a three-frame period.

A of FIG. 8 shows frame numbers. B of FIG. 8 shows input image data. C of FIG. 8 shows encoding in the first encoding unit 31. D of FIG. 8 shows encoding in the second encoding unit 32. E of FIG. 8 shows encoding in third encoding unit 33. F, G, and H of FIG. 8 show reference image data. I, J, and K of FIG. 8 show encoded data. L of FIG. 8 shows encoded data to be output.

During frame 0, the DMA 21 stores image data B0 for the B picture in the shared memory 41. During frame 1, the DMA 21 stores the image data B1 for the B picture in the shared memory 41. During frame 2, the DMA 21 stores the image data I2 for the I picture in the shared memory 41. The control unit 61 does not start the encoding for the B picture during the periods of frames 0 to 2 since reference image data is not stored in the shared memory 41.

During frame 3, the DMA 21 stores the image data B3 for the B picture in the shared memory 41. The control unit 61 makes the I picture be encoded by priority since the image data I2 for the I picture is stored in the shared memory 41 during frame 2. The control unit 61 makes, for example, the first encoding unit 31, which has been secured, encode the image data I2. For this reason, the first encoding unit 31 encodes the image data I2 using the three-frame period of frames 3 to 5, and stores the encoded data I2E and the reference image data I2L in the shared memory 41. The control unit 61 secures the second encoding unit 32 so as to encode the next I picture or the next P picture when the encoding for the image data I2 is completed.

During frame 4, the DMA 21 stores the image data B4 for the B picture in the shared memory 41. The control unit 61 does not start the encoding for the B picture since reference image data is not stored in the shared memory 41.

During frame 5, the DMA 21 stores the image data P5 for the P picture in the shared memory 41. The control unit 61 does not start the encoding for the B picture since reference image data is not stored in the shared memory 41.

During frame 6, the DMA 21 stores the image data B6 for the B picture in the shared memory 41. The control unit 61 makes the P picture be encoded by priority since the image data P5 for the P picture is stored in the shared memory 41 during frame 5. The control unit 61 makes the secured second encoding unit 32 encode the image data P5. For this reason, the second encoding unit 32 encodes the image data 55 using the three-frame period of frames 6 to 8, and stores the encoded data P5E and the reference image data P5L in the shared memory 41. During frame 6, the encoding for the image data I2 is completed, and the reference image data I2L is stored in the shared memory 41. The first encoding unit 31 completes the encoding, and the third encoding unit 33 does not perform encoding. Therefore, the control unit 61 selects the first encoding unit 31 and the third encoding unit 33 to encode the image data B0 and B1. In other words, the first encoding unit 31 encodes the image data B0 using the three-frame period of frames 6 to 8, and stores the encoded data B0E in the shared memory 41. In addition, the third encoding unit 33 encodes the image data B1 using the three-frame period of frames 6 to 8, and stores the encoded data B1E in the shared memory 41. The control unit 61 secures the first encoding unit 31 so as to encode the next I picture or the next P picture when the encoding for the image data P5 is completed.

During frame 7, the DMA 21 stores the image data B7 for the B picture in the shared memory 41. The control unit 61 does not start encoding for new pictures since the first encoding unit 31, the second encoding unit 32, and the third encoding unit 33 perform the encoding.

During frame 8, the DMA 21 stores the image data P8 for the P picture in the shared memory 41. The control unit 61 does not start encoding for new pictures since the first encoding unit 31, the second encoding unit 32, and the third encoding unit 33 perform the encoding.

During frame 9, the DMA 21 stores the image data B9 for the B picture in the shared memory 41. The control unit 61 makes the P picture be encoded by priority since the image data P8 for the P picture is stored in the shared memory 41 during frame 8. The control unit 61 makes the secured first encoding unit 31 encode the image data P8. For this reason, the first encoding unit 31 encodes the image data P8 using the three-frame period of frames 9 to 11, and stores the encoded data P8E and the reference image data P8L in the shared memory 41. In addition, during frame 9, the encoding for the image data P5 is completed, and the reference image data I2L and P5L are stored in the shared memory 41. The second encoding unit 32 and the third encoding unit 33 do not perform the encoding. Therefore, the control unit 61 selects the second encoding unit 32 and the third encoding unit 33 to encode the image data B3 and B4. In other words, the second encoding unit 32 encodes the image data B3 using the three-frame period of frames 9 to 11, and stores the encoded data B3E in the shared memory 41. In addition, the third encoding unit 33 encodes the image data B4 using the three-frame period of frames 9 to 11, and stores the encoded data B4E in the shared memory 41.

During frame 10, the DMA 21 stores the image data B10 for the B picture in the shared memory 41. The control unit 61 does not start encoding for new pictures since the first encoding unit 31, the second encoding unit 32, and the third encoding unit 33 perform the encoding.

During frame 11, the DMA 21 stores the image data P11 for the P picture in the shared memory 41. The control unit 61 does not start encoding for new pictures since the first encoding unit 31, the second encoding unit 32, and the third encoding unit 33 perform the encoding.

In the same manner hereinafter, the encoding unit used to encode an I picture or a P picture is alternately changed to the first encoding unit 31 and the second encoding unit 32. In addition, reference image data generated through the encoding for the I picture or the P picture is stored in the shared memory 41. The B picture is encoded using the reference image data stored in the shared memory 41 by the encoding unit which does not encode the I picture or the P picture of the first encoding unit 31 and the second encoding unit 32, and by the third encoding unit 33.

The encoding is performed in this way, and thus the encoded data is stored in the shared memory 41 as shown in I, J, and K of FIG. 8. Therefore, the control unit 61 controls the DMA 51 to read the encoded data in an order of the encoded data I2E, B0E, B1E, P5E, . . . , for example, from the frame 9. By reading the encoded data in this way, it is possible to output an encoded bit stream obtained through the encoding for the input image data from the image processing device 10*a*.

Thereby, since the first encoding unit 31 and the second encoding unit 32 can perform the encoding in parallel using the reference image data stored in the shared memory, it is possible to perform the encoding at high speed. In addition, in the case where the cycle M of the I and P pictures is 3 and a period necessary for one encoding is a three-frame period such as in the first embodiment, the first encoding unit 31 and the second encoding unit 32 are alternately used as shown in FIG. 8, and the I picture and the P picture are encoded by priority. In addition, if each encoding unit encodes two B pictures using a non-encoding period where the encoding is not performed, it is possible to sequentially encode input image data. Since the encoding is sequentially performed for each image plane, boundary parts are not shown unlike the case of performing encoding in parallel for the respective regions into which an image plane is divided, and a large-volume buffer is not necessary unlike the case of performing encoding in parallel with GOP units. Further, it is possible to reduce latency as compared with the case of performing encoding in parallel with GOP units.

In addition, in the case of using the three encoding units, if the cycle M of the I and P pictures is 3, there is a three-frame period until the encoding unit which has encoded an I picture or a P picture encodes the next I picture or the next P picture. Therefore, even if a period necessary for the encoding unit to perform the encoding is a three-frame period in order to perform, for example, a prediction process with high accuracy, it is possible to sequentially encode the input image data.

In FIGS. 4, 7 and 8, although the case where the encoding conditions are M=3 and N=14 in the progressive method has been described, the encoding conditions are not limited to these conditions. In other words, during a period where an encoding unit which has encoded an I picture or a P picture does not perform encoding, the number of B pictures or the number of encoding units may be set such that the encoding for the B picture between the I picture and the P picture or the P picture and the P picture is completed. In other words, in a case where a period necessary to encode one picture is equal to or less than the cycle M of the I and P pictures, more encoding units are provided than the number of B pictures within the cycle M of the I and P pictures by one. When the encoding units are provided in this way, encoding for a B picture between an I picture and a P picture or a P picture and a P picture can be completed during a period where the encoding unit which has encoded the I picture or the P picture does not perform encoding. Therefore, it is possible to sequentially encode input image data.

When all pictures are intra-frame prediction encoded images, it is preferable that image data for the respective pictures is sequentially allocated to a plurality of encoding units and is encoded in parallel.

3. Case of Performing Encoding with Software

The series of processes described in the specification may be executed by hardware, software, or a combination thereof.

In a case of performing the processes with software, the processes are executed by installing a program in which a process sequence is recorded in a memory of a computer, which is built in dedicated hardware. Alternatively, the processes may be executed by installing the program in a personal computer which can execute various kinds of processes.

Figure 9:
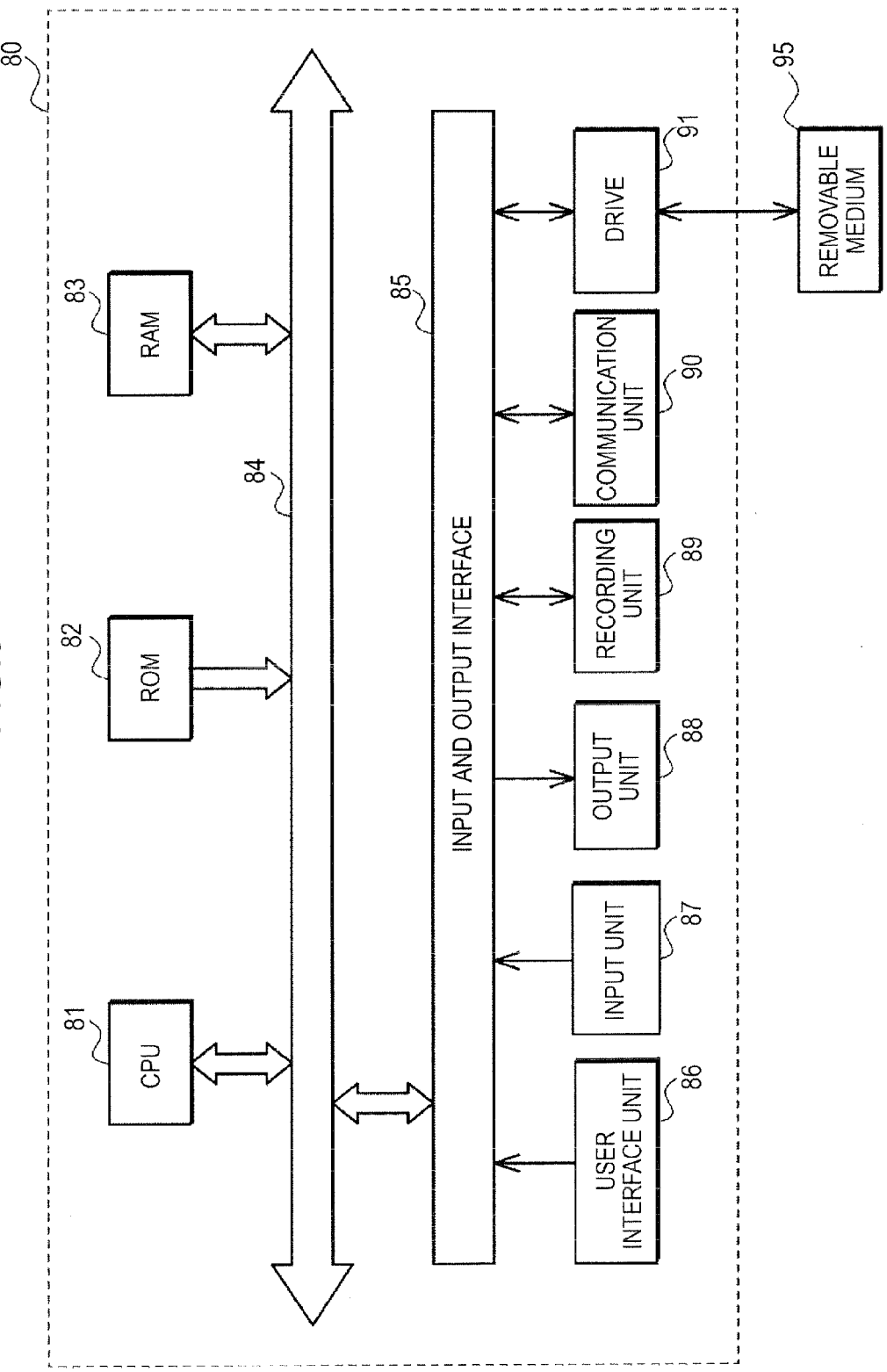
FIG. 9 is a diagram illustrating a computer configuration example.

FIG. 9 is a diagram illustrating a configuration example of a computer which executes the series of processes using a program. A CPU 81 of a computer device 80 is, for example, a multi-core CPU, and performs encoding according to a program stored in a ROM 82 or a recording unit 89.

A RAM 83 appropriately stores programs, data or the like executed by the CPU 81. The CPU 81, the ROM 82, and the RAM 83 are connected to each other via a bus 84.

The CPU 81 is connected to an input and output interface 85 via the bus 84. The input and output interface 85 is connected to a user interface unit 86 constituted by a touch panel, a keyboard, a mouse, or the like, an input unit 87 for inputting image data, and an output unit 88 constituted by a display, and the like. The CPU 81 performs various kinds of processes in response to commands input from the user interface unit 86. The CPU 81 outputs a processed result from the output unit 88.

The recording unit 89 connected to the input and output interface 85 includes, for example, a hard disk, and stores programs or various kinds of data executed by the CPU 81. A communication unit 90 communicates with external devices via a network such as the Internet or a LAN, or a wired or wireless communication medium such as digital broadcasting. The computer device 80 may obtain a computer program via the communication unit 90 and store it in the ROM 82 or the recording unit 89.

A drive 91 drives a removable medium 95 such as a magnetic disk, an optical disc, a magneto-optical disc, or a semiconductor memory, which is installed, and obtains computer programs, data, or the like recorded thereon. The obtained computer programs or data are transmitted to the ROM 82, the RAM 83, or the recording unit 89 as necessary.

The CPU 81 reads and executes a computer program which performs the series of processes, and encodes image data recorded in the recording unit 89 or the removable medium 95, or image data supplied via the communication unit 90.

The present disclosure should not be construed as being limited to the above-described embodiments. The embodiments are examples of the present disclosure, and it is apparent that a person skilled in the art can modify or alter the embodiments without departing from the scope of the present disclosure. In other words, if the scope of the present disclosure is to be determined, the appended claims should be taken into account.

According to the image processing device and the image processing method in the present disclosure, a shared memory is provided, and an encoding unit which encodes image data performs encoding using reference image data stored in the shared memory. In addition, an encoding unit is secured from a plurality of encoding units so as to encode an intra-frame prediction encoded image and a forward prediction encoded image by priority. An encoding unit which is not used to encode the intra-frame prediction encoded image or the forward prediction encoded image encodes a bidirectional prediction encoded image using reference image data stored in the shared memory during a period where the secured encoding unit does not perform encoding. Thereby, boundary parts are not shown unlike the case of performing encoding in parallel for the respective regions into which an image plane is divided, and a large-volume buffer is not necessary unlike the case of performing encoding in parallel with GOP units.

Further, it is possible to reduce latency as compared with the case of performing encoding in parallel with GOP units. Therefore, the present disclosure is suitable for a recording and reproducing device, a communication device, an editing device of image data, or the like.

The present disclosure contains subject matter related to that disclosed in Japanese Priority Patent Application JP 2010-141568 filed in the Japan Patent Office on Jun. 22, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a plurality of encoding units that encode image data;
a shared memory that stores reference image data which is used for encoding performed by each of the plurality of encoding units; and
a control unit that secures an encoding unit from the plurality of encoding units, which is made to encode an intra-frame prediction encoded image and a forward prediction encoded image by priority, and that makes an encoding unit, which is not used to encode the intra-frame prediction encoded image or the forward prediction encoded image, encode a bidirectional prediction encoded image, using reference image data stored in the shared memory during a period where the secured encoding unit does not perform the encoding.

2. The image processing device according to claim 1, wherein the control unit alternately secures an encoding unit from two encoding units, and makes the encoding unit encode the intra-frame prediction encoded image and the forward prediction encoded image by priority.

3. The image processing device according to claim 2, wherein the control unit completes encoding for a bidirectional prediction encoded image between an intra-frame prediction encoded image and a forward prediction encoded image or a forward prediction encoded image and a forward prediction encoded image, during a period from completion of the encoding for the intra-frame prediction encoded image or the forward prediction encoded image until the encoding unit which has performed the encoding encodes a next intra-frame prediction encoded image or a next forward prediction encoded image.

4. The image processing device according to claim 3, wherein an encoding unit is provided separately from the encoding unit which encodes the intra-frame prediction encoded image and the forward prediction encoded image by priority, and
wherein the control unit makes the separate encoding unit encode the bidirectional prediction encoded image.

5. The image processing device according to claim 4, wherein more encoding units are provided than the number of the bidirectional prediction encoded images between the intra-frame prediction encoded image and the forward prediction encoded image or the forward prediction encoded image and the forward prediction encoded image by one.

6. The image processing device according to claim 1, wherein the shared memory stores image data which is encoded and the encoded data obtained by the encoding therein.

7. An image processing method comprising:
causing a plurality of encoding units to encode image data;

causing a shared memory to store reference image data which is used for encoding performed by each of the plurality of encoding units; and causing a control unit to secure an encoding unit from the plurality of encoding units, which is made to encode an intra-frame prediction encoded image and a forward prediction encoded image by priority, and to make an encoding unit, which is not used to encode the intra-frame prediction encoded image and the forward prediction encoded image, encode a bidirectional prediction encoded image, using reference image data stored in the shared memory during a period where the secured encoding unit does not perform the encoding.

* * * * *